Patented June 20, 1933

1,914,902

UNITED STATES PATENT OFFICE

WILLIAM HUNTER VOLCK, OF WATSONVILLE, CALIFORNIA, ASSIGNOR TO CALIFORNIA SPRAY-CHEMICAL CORPORATION, OF SAN FRANCISCO, CALIFORNIA, A CORPORATION OF DELAWARE

MANUFACTURE AND USE OF PARASITICIDAL EMULSIONS

No Drawing.    Application filed February 25, 1929. Serial No. 342,671.

My invention relates to the making and preservation of oil emulsions in water, more particularly to insecticidal emulsions of oil and especially quick-breaking emulsions such as described in my copending application Serial No. 663,486 filed September 17, 1925 when these are intended for shipment in small packages.

When oil is emulsified in an aqueous emulsifier, there is an inevitable tendency to stratify on standing, owing to the difference in specific gravity of the oil and the aqueous emulsifier. This stratification is similar to the rising of cream out of whole milk on standing. In the preparation of commercial oil emulsions, this stratification has hitherto been prevented or largely prevented by making the stock emulsion so thick or even paste-like that the small particles of emulsified oil cannot move in response to the force of gravity.

Such thick or paste-like mixtures are reasonably satisfactory for most purposes though they are not easy to dilute. In small packages intended for household or other small users, however, these pastes are more or less inconvenient owing to the trouble in mixing with water to dilute them for application and to the difficulty of removing the material from the container. The container must be provided with a large lid or opening. Such lids are difficult to remove and also to replace tightly, so that the proper keeping of the material remaining in the package is assured.

For general uniformity in storage and ease of dilution, and particularly for vending in small packages, a liquid or free flowing emulsion is most desirable provided it will not stratify or become ununiform in consistency. No good way of avoiding the difficulty has been known so far as I am aware and it has caused great inconvenience for many years. Makers of emulsions have added all kinds of thickeners and resorted to very large quantities of emulsifying agents, particularly tough stabilizing substances formed at the interfaces of the emulsified globules, the making of practically solid emulsions, etc. at considerable expense to avoid the trouble or minimize the resulting inconvenience, even going so far as to add water soluble materials which gelatinized when in more concentrated solution, such as gelatin or agar-agar.

In the shipment and sale of quick-breaking emulsions above referred to this problem again arose and after much trouble and experiment, I have accomplished this desired end by adding to the mineral or other oil used in the emulsion a suitable quantity of an oil- soluble or miscible substance having a specific gravity greater than that of the aqueous emulsifier. The quantity of such substance I prefer to add is approximately sufficient to equalize the density of the oil solution or mixture, so as to practically balance the effect of gravity on the oil, so that it is about the same as that of the aqueous phase of the emulsifier. Oils so treated I call for convenience balanced oil mixtures or balanced oils and the emulsions produced therewith I call balanced emulsions.

Many such heavy oil-soluble substances are known to me such as carbontetrachloride, carbondisulfide, paradichlor benzol, anthracene oil, chlornapthalenes, and various volatile, slightly water soluble or readily absorbable materials which will not damage the plant either by specific toxic action or by closing its pores and rendering it unhealthy. Such volatile, slightly water soluble or readily absorbable materials I call, for brevity, "transient materials" or "transient substance" and the resulting oils as "transient-balanced." Of these substances, I find carbon tetrachloride well adapted for general purposes. Carbon tetrachloride blends readily with mineral, vegetable or other oils, is relatively heavy, and quite volatile. This latter property causes it to be dissipated quickly when applied to plants and this quick removal minimizes any injurious effect which the compound may have upon the plants. Carbon tetrachloride may thus be used generally if there is no objectionable chemical reaction between it and the particular emulsifying agent or the particular container being used during the time of shipment and storage. In this respect most of the ordinary emulsifiers such as casein and its salts, sulfite pulp waste liquor, British gum, whale oil soap, etc., may be used in suitable quantity without action on the carbon tetrachloride or vice versa or the polar emulsifiers operating within the surface of the oil.

In the practice of my invention, I find it advisable to make the specific gravity of the oil-carbon tetrachloride mixture slightly greater than that of the emulsifier for, if the specific gravity is exactly the same, there is still a tendency for the emulsified oils to rise (or "cream") owing to the greater relative cubical expansion of oil as compared with water, and also due to the fact that many gases dissolve in oils to a greater extent than in water and so may cause a reduction in the specific gravity of the oil mixture. In emulsifying oil it is very difficult to avoid the introduction of air and other gases into the mass. I find that a difference in density of the oil phase over the water phase of about .02 is sufficient in general to overcome these effects, and make a more accurately balanced oil.

I find also that the use of more dilute mixtures in which gravity is thus balanced has advantages other than the preservation of a uniform consistency in the container. For example, the tendency to breaking down of quick-breaking emulsions above referred to, owing to the smaller quantity or weakness of the emulsifying agent, increases as the concentration of the oil is increased. I believe the closer the oil particles are packed together, the greater the tendency to unite together and prematurely destroy the emulsion. In my balanced emulsions, in which the oil particles need not be closely packed together, this tendency to break down may be wholly avoided or greatly reduced and the emulsion is, therefore, much more reliable and durable than the concentrated paste type emulsion.

The valuable reliability and durability of the emulsion may thus be attained without any increase in the inherent stability, or resistance to breaking when desired. This inherent stability I believe to be due to the thickness and toughness of the adsorption layer of emulsifying agent about the oil globule, and in my co-pending application above referred to I have shown this inherent stability to be detrimental to the effective use of the emulsion for oiling surfaces as in parasiticidal work. With balanced emulsions, on the contrary, the greater durability is not thus objectionable; rather the contrary, because the density of the oil particles tends to make it more certain to unite with the surface upon which the spray impinges, and less easily carried off in the excess water.

This improved action, on the one hand, and the greater reliability and durability of the balanced emulsions on the other, are what I believe make it possible with balanced emulsions to use a much wider range of emulsifying agents, and to make better use of the quick-breaking principle as now applied to use of oil emulsions in spraying plants.

The concentrations I now prefer as most suitable in applying this invention to oil sprays for parasiticidal work on plants range from about 50 percent balanced oil mixture and 50 percent aqueous emulsifying medium, to about 66⅔ percent balanced oil mixture and 33⅓ percent of aqueous emulsifying medium as proportions between those given are generally capable of producing a flowable and durable mixture. It should be understood, however, that other ratios of oil to emulsifying medium are included and that I do not limit myself to these proportions.

Nor do I limit myself to the use in my invention of carbon tetrachloride in oil sprays for parasiticidal work, though that is the weighting agent which I have most largely applied. Other substances of specific action on the plant or parasite are applicable to making durable and reliable emulsions either of the quick-breaking or of other types and may be selected also for other purposes such as simultaneously producing the polar emulsions or the poisoned oils of Hugh Knight's U. S. Patents 1,707,467 and 1,707,470 either alone or in combination. Obviously if the mean density of the oil should be substantially greater than water after addition of the polar emulsifier or the poison or such other material as experience may indicate should be added thereto or combined therewith or a combination of such additions, the invention and explanation thereof herein disclosed would also include the addition of lighter petroleum fractions or other material whether volatile or not, to again bring the density of the "balanced oil" down to about 1.01 or slightly higher than that of the aqueous dispersion medium, or the density of the aqueous dispersion medium increased by suitable means such as the addition of larger quantities of dispersing agents of less protective power, if desired, without departing from the spirit of my invention.

What I claim and desire to secure by Letters Patent is:

1. The method of manufacturing a plant parasiticide containing an oil emulsified in an aqueous liquid medium, which consists in preparing a balanced oil mixture by admixing with the oil to be emulsified a nonsaponifiable organic compound of a substantially greater density than the liquid medium in a proportion to make the mean density of the balanced mixture substantially equal to the density of the liquid medium in which the mixture is emulsified and thoroughly dispersing the balanced mixture in the liquid emulsifying medium.

2. The method of manufacturing a plant parasiticide containing an oil emulsified in an aqueous liquid medium, which consists in preparing a balanced oil mixture by admixing with the oil to be emulsified carbon tetrachloride in a proportion to make the mean density of the balanced mixture substantially equal to the density of the liquid medium in which the mixture is emulsified and thoroughly dispersing the balanced mixture in the liquid emulsifying medium.

3. The method of manufacturing a plant parasiticide containing an oil emulsified in an aqueous liquid medium, which consists in preparing a balanced oil mixture by admixing with the oil to be emulsified anthracene oil in a proportion to make the mean density of the balanced mixture substantially equal to the density of the liquid medium in which the mixture is emulsified and thoroughly dispersing the balanced mixture in the liquid emulsifying medium.

WILLIAM HUNTER VOLCK.